T. CARROLL.
CASH REGISTER.
APPLICATION FILED SEPT. 12, 1903.
1,097,703.
Patented May 26, 1914.
7 SHEETS—SHEET 7.
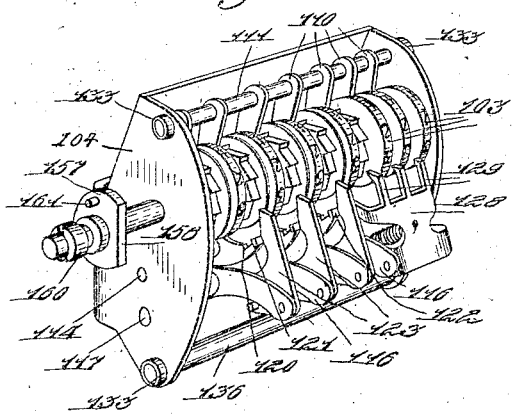
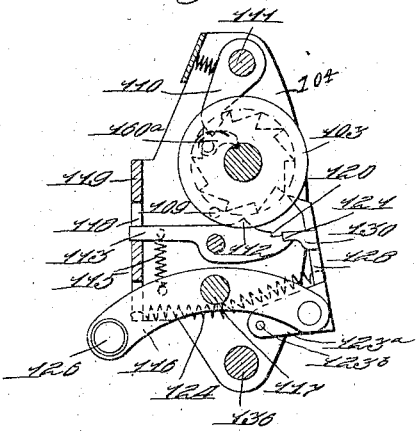
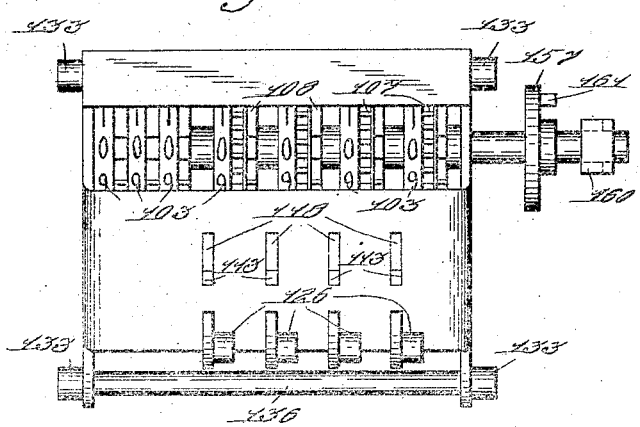
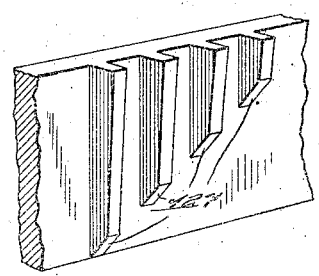
Witnesses
Inventor
Thomas Carroll
Attorneys

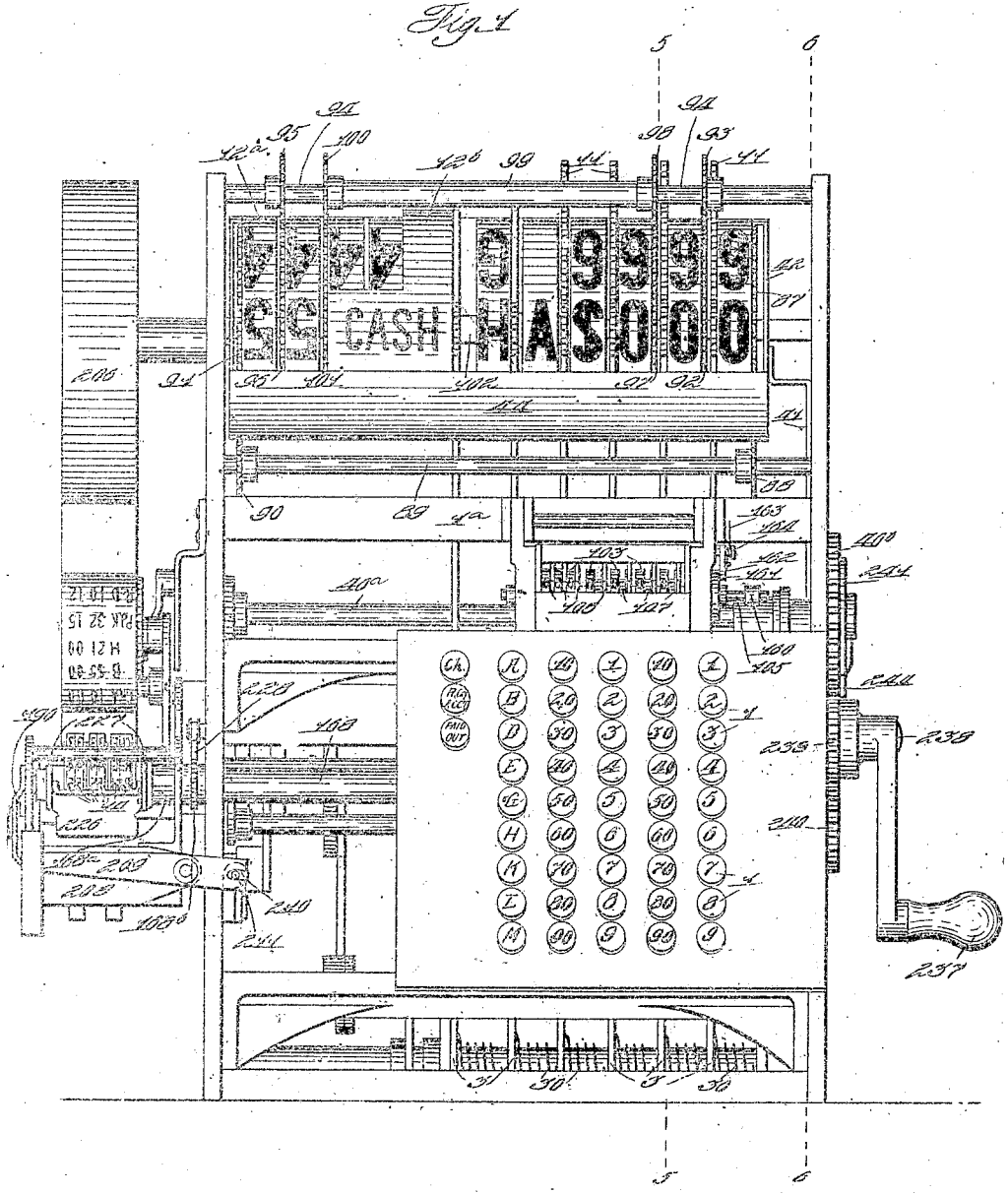

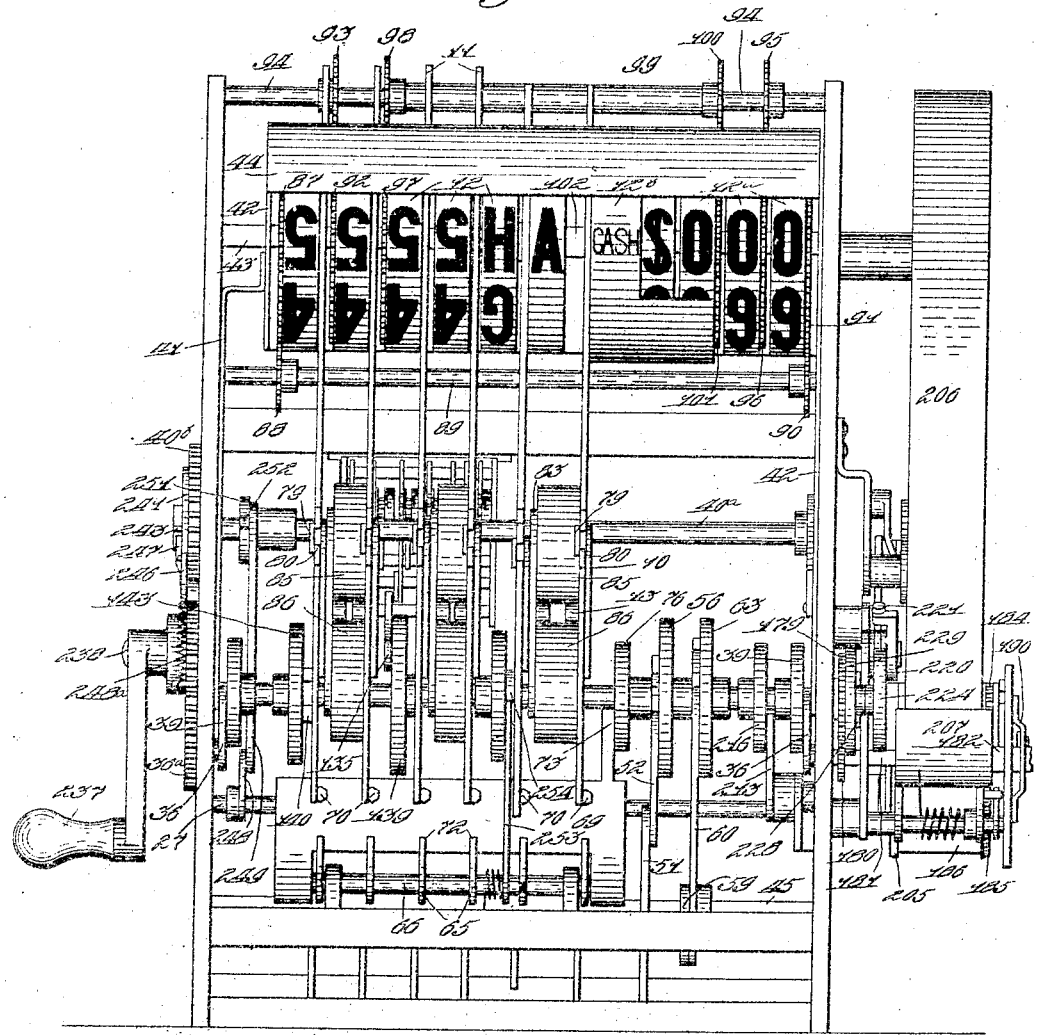

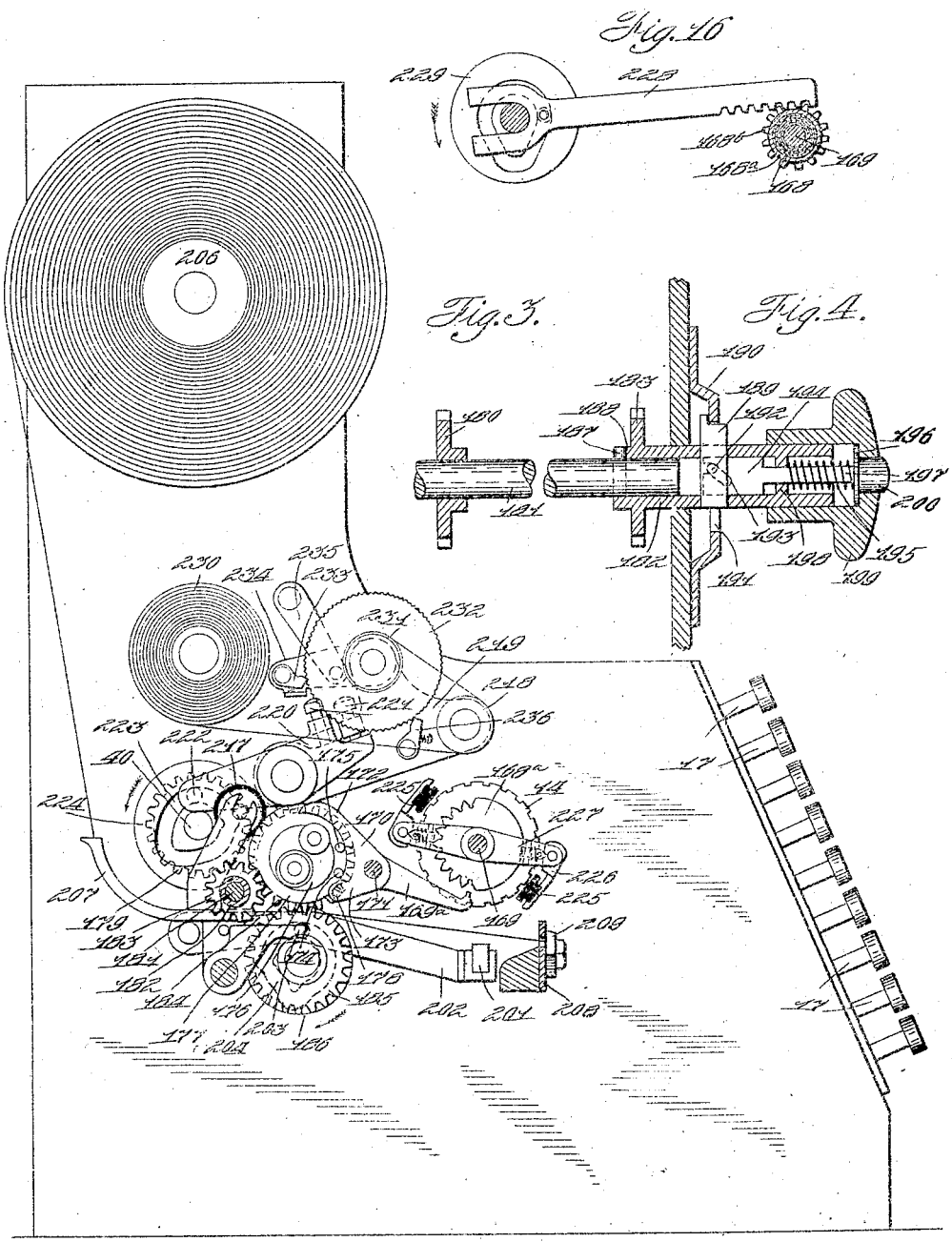

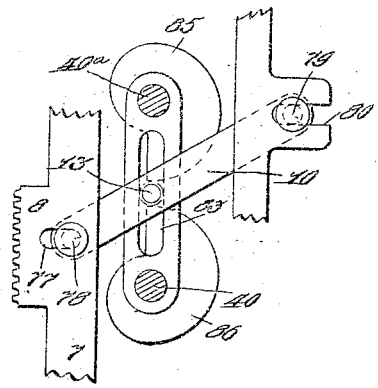
Fig. 15.
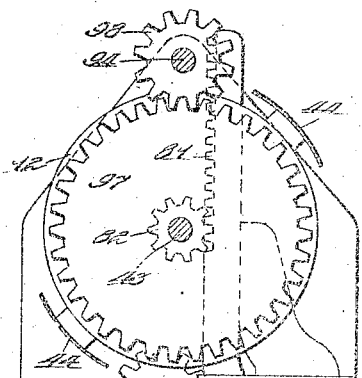
Fig. 5.
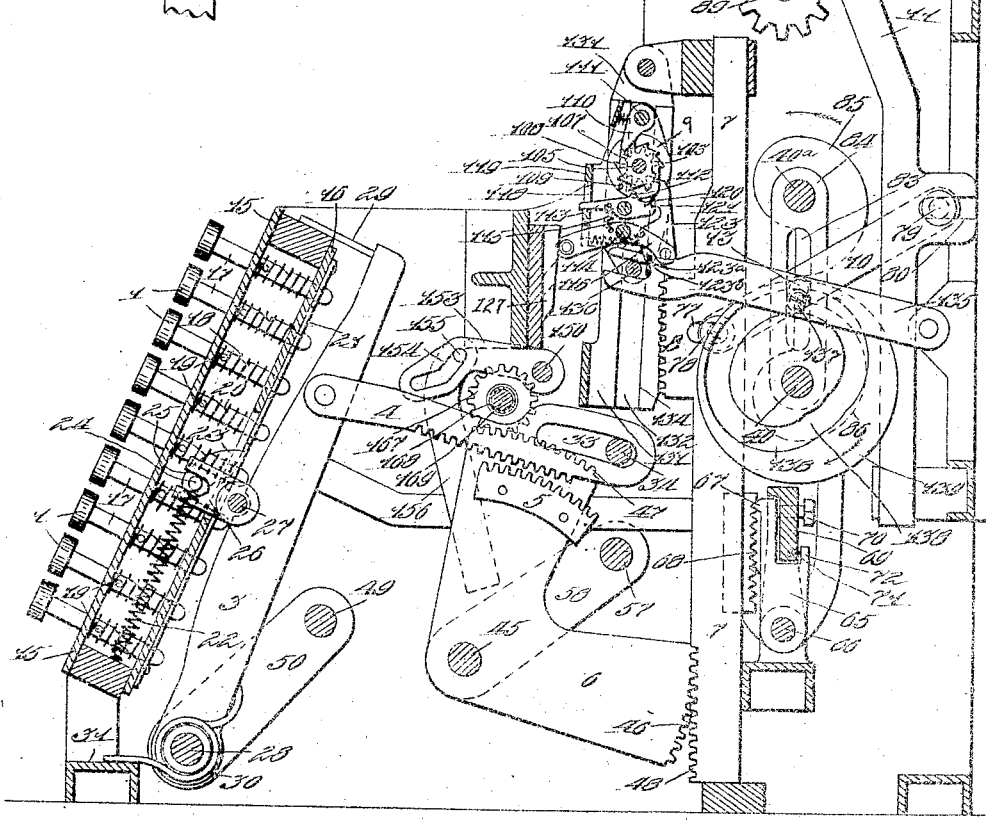

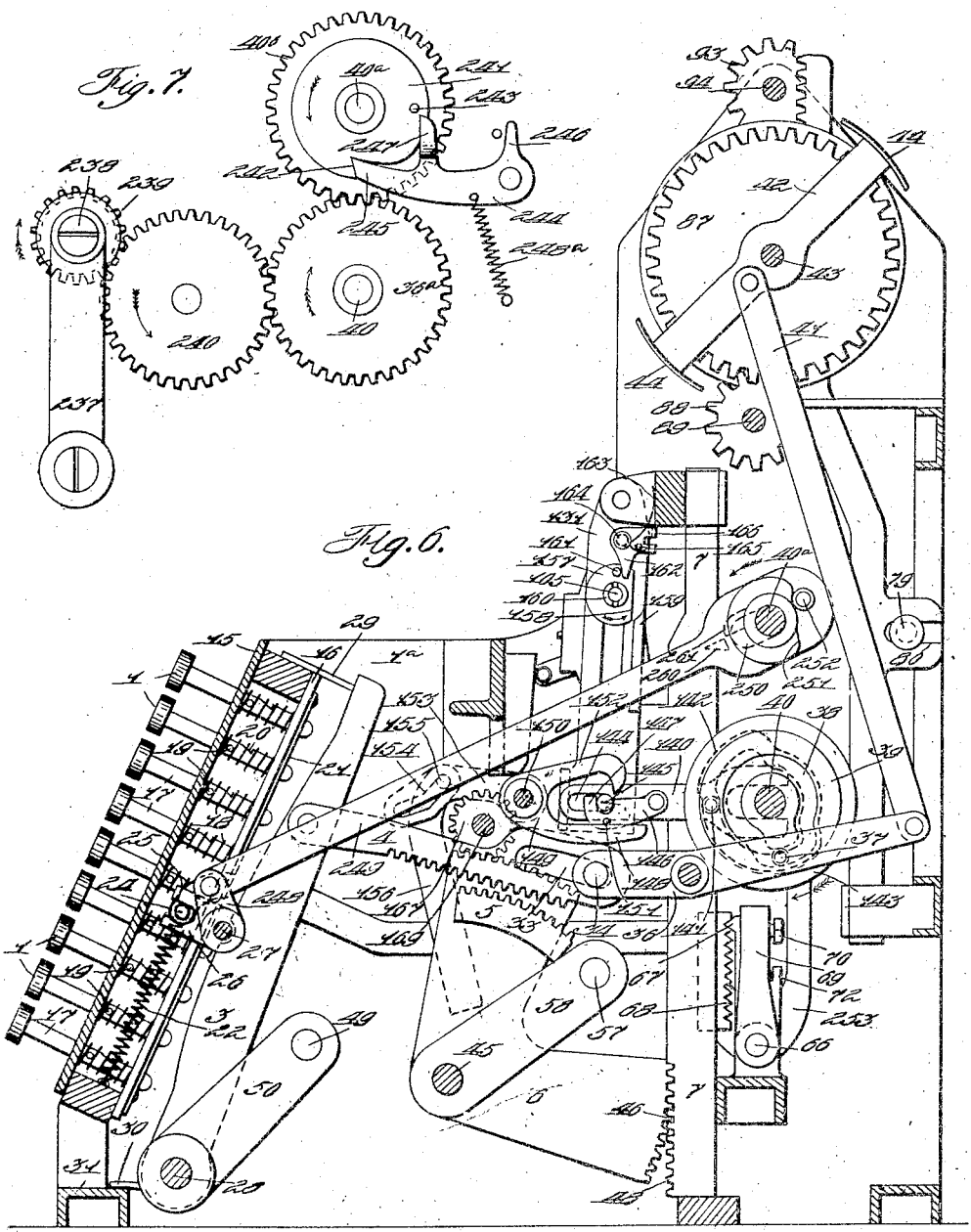

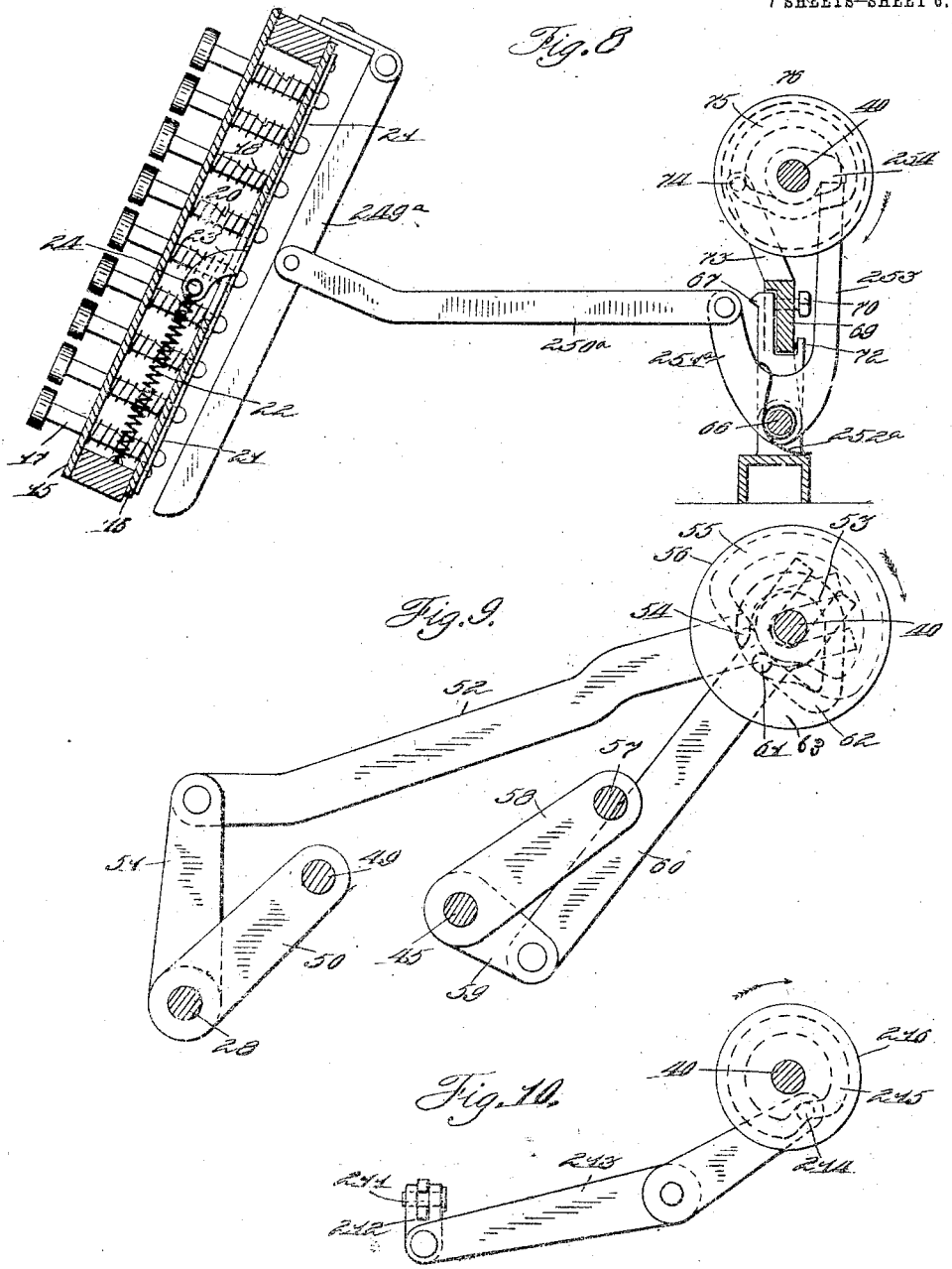

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,097,703.  Specification of Letters Patent.  Patented May 26, 1914.

Application filed September 12, 1903. Serial No. 172,970.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers.

One of the objects of the invention is to lessen the number of parts and simplify the make-up in a construction for totalizing, indicating and printing the amounts of transactions set up by a series of controlling elements, thereby relieving the machine of considerable weight and greatly reducing the cost of manufacture.

Another object is to provide improved devices for actuating the registering mechanism by an operating handle or lever and controlling such operation by a series of previously manipulated setting elements.

A further object is to provide an improved indicating mechanism whereby suitably inscribed disks or members may be moved from one indicating position to another without having to be first returned to a "zero" or initial position.

With these and certain other objects in view, as will be hereinafter apparent, the invention consists in certain novel constructions, combinations and arrangements of parts, the essential elements of which will be found recited in the appended claims, and a preferred form of embodiment as described in detail in the following specification and fully illustrated in the accompanying drawings forming part thereof, and in which:

Figure 1 represents a front elevation of the machine embodying my invention; the cabinet of the same and the cash drawer being omitted. Fig. 2 represents a rear elevation of the same. Fig. 3 represents an end elevation of the machine, taken from the left. Fig. 4 represents a detail vertical section through the devices for throwing the check printing mechanism into and out of operative connection with the operating mechanism. Fig. 5 represents a central vertical section through the machine on the line 5—5 of Fig. 1. Fig. 6 represents a similar section on the line 6—6 of Fig. 1. Fig. 7 represents a detail side elevation of the operating handle, the connecting gearing, and the automatic stop. Fig. 8 represents a detail side elevation partly in section of the machine lock, and the bank of special keys which actuate the same. Fig. 9 represents a detail side elevation partly in section of the returning levers or frames, and the devices connecting them to the main operating shaft. Fig. 10 represents a detail side elevation of the knife operating lever and cam. Fig. 11 represents a detail perspective view of the counter. Fig. 12 represents a vertical transverse section through the same. Fig. 13 represents a front elevation of the counter. Fig. 14 represents a detail perspective view of the transfer lever operating flanges or cams. Fig. 15 represents a detail side elevation of one of the indicator operating levers and its actuating cams and connected parts; and Fig. 16 represents a detail sectional view of the mechanism for operating the ink pads.

In order that the general features of the present invention may be more fully understood, before entering into a detail description of the different mechanisms, the arrangement and functions of the most important operating elements of the machine will be described.

The amount keys 1 are arranged in groups or banks and represent numerals from one to nine. When a key of any one of these banks is depressed it engages one of a series of pivoted levers 3 and forces the same rearward to an extent equal to the value of the key operated. (See Fig. 5.) The lever 3 is pivotally connected to a rack bar 4 which is carried rearwardly with the lever and is then forced into mesh with a segmental rack 5 mounted upon an oscillating segment 6. The lever 3 is then returned to its normal position thus rocking the segment 6 to an extent equal to the value of the key operated. Said segment 6 meshes with a vertically sliding rack bar 7. This bar is provided with counter operating rack teeth 8. After this rack is set in the manner above described, a counter 9 is drawn downward over the same and thereby actuated. A pivoted lever 10 is connected at its forward end to the bar 7 and when said bar is elevated, as above described, the forward end of the lever is also elevated. The rear end of this lever 10 is pivotally connected to a vertically sliding rack bar 11, arranged to actuate a rotary indicator 12. The lever 10 is provided with an anti-friction roller 13 mounted about midway of its length. After the bar 7 is set, as above described, the anti-friction roller 13 is cammed to a common position and the lever 10 thus actuated to operate the bar 11 to set the indicator.

Hereafter follows a detail description of the different parts of my invention:

*The key-board.*—The key-board comprises spaced plates 15 and 16 suitably secured upon the main frame 1ª of the machine and apertured to receive the square shanks 17 of the keys. Coil springs 18 surround the shanks intermediate the two plates 15 and 16 and engage said latter plate and pins 19 projecting from the shanks whereby the keys, when depressed, will have a tendency to resume their normal positions. Each of the keys is, of course, provided with a proper character, numeral, or other designation upon its end. Each of the key shanks is formed with a notch 20 whereby, when the key is depressed, it will be locked in this depressed position by a sliding apertured detent plate 21, mounted under the plate 16 and normally drawn downward by a coil spring 22 which connects an arm 23 of said plate to the main frame, as best shown in Fig. 8. The arm 23 is provided with a pin 24 which projects into an elongated notch 25 formed in an arm 26, fast on a rock shaft 27. When this shaft 27 is rocked, the detent plate 21 is forced upward against the tension of its spring and any keys that have been latched by the same are released and allowed to assume their normal positions. The shaft 27 is provided with an operating arm 248 which is pivotally connected to a link bar 249. This bar is formed at its rear end with an elongated slot 250 through which passes the rotary shaft 40ª. A cam 251 mounted on the shaft 40ª coöperates with an anti-friction roller 252 mounted on the link bar 249. By this means the bar 249 is reciprocated upon each operation of the machine and the detent plates thus elevated to release all of the depressed keys. In order to prevent manipulation of the machine by partially depressing a key, I provide the link bar 249, (see Fig. 6) with a stud 260 which, when a key is started, moves into the path of a lug 261 mounted on the shaft 40ª. As soon as a key is fully depressed the stud 261 is drawn to its normal position by the spring 22.

I have described above one of the amount banks of keys and it will be understood that the remaining amount banks, as well as the special key banks, are identical with the same except that the bars 7 of the special banks are not provided with any counter operating rack teeth. I will now describe the main operating elements of the machine and in doing so will simply include the operating parts for one bank as such description will suffice for all banks.

*Main operating elements.*—Each of the aforesaid levers 3 is journaled upon a transverse shaft 28 and is normally forced forward against a stop flange 29 by a coil spring 30 which surrounds said shaft 28 and bears with its opposite ends, one against a tie bar 31 of the main frame and the other against said lever. (See Fig. 5.) By reference to said figure it will be seen that the forward edge of the levers 3 is curved or graduated in relation to the ends of the key shanks 17, whereby, when the different keys are depressed, their shanks will engage said lever sooner or later during their movements and thus move the lever different distances according to the value of the keys operated. The rack bar 4 is pivotally connected at its forward end to its respective lever 3 and is formed near it rear end with an elongated slot 33 through which passes a transverse shaft 34, as plainly shown in Fig. 5. By reference to this figure it will be seen that the rack teeth upon the bar 4 are normally clear of the teeth of the rack 5 so that the bar may be moved freely back with the lever 3 without engaging the rack 5. When the shaft 34 is slightly depressed, however, the teeth of the rack bar 4 are brought into mesh with the segment 5 so that any subsequent movement of the bar will be imparted to the segment 6.

To accomplish the above result the shaft 34 is supported between the forward ends of two pivoted levers 36, best shown in Fig. 6. These levers are pivotally mounted upon the main frame and are provided with anti-friction rollers 37 which project into the cam grooves 38 of box cams 39, fast to the rotation shaft 40. By this construction, when the shaft 40 is rotated the levers 36 are rocked and the racks 4 thus brought into mesh with the segments 5 during a certain period and then disengaged from the same. The segments 6 are journaled upon a transverse shaft 45 and are formed with two series of rack teeth 46 and 47. The teeth 46 mesh with rack teeth 48 formed on vertically sliding bars 7 which are suitably mounted in the main frame. These bars 7 are also formed with totalizer operating rack teeth 8 which will be hereinafter more fully described.

After the lever 3 has been forced rearward and the rack teeth moved down into mesh with the rack 5, said lever is returned to its normal position thereby rocking the segment 6 and elevating the bar 7 a distance proportionate to the return movement of said lever. This return of the lever is effected by a transverse rod 49 mounted in the upper ends of two arms 50 which are fast to the rock shaft 28. The shaft 28 is rocked during the proper period for returning the levers 3 by an arm 51 which is fast on said shaft and is pivotally connected to the forward end of a link bar 52. The rear end of this bar is slotted as at 53 to straddle the rotation shaft 40 and is provided with a laterally projecting anti-friction roller 54. (See Fig. 9.) This roller projects into a cam groove 55 of a box cam 56 which is fast on said shaft 40. By this means the link 52 is properly reciprocated during each operation of the machine to impart the proper movements to the arms 50 and rod 49. After an amount has been registered, which requires the operation of any one of the segments 6, the segment is left at the end of the operation of the machine standing in a set position. It is therefore necessary to return such segments to their normal positions upon the initial movement of the operating handle during the succeeding operation of the machine. To accomplish this result I provide a returning bar 57. This bar 57 is mounted in the rear ends of two arms 58 fast to the transverse shaft 45. The shaft 45 is provided with an operating crank arm 59 which arm is pivotally connected to a link bar 60. The upper end of this link bar is provided with an anti-friction roller 61 which projects into a cam groove 62 formed in a box cam 63. (See Fig. 9.) This box cam is fast upon the shaft 40 and when the latter is rotated, rocks the shaft 45 and thereby properly oscillates the rod 57 to return all of the segments 6 to their normal positions at the proper time. As the vertically movable rack bars 7 are positively and permanently geared to the segments 6 they are returned to their normal positions together with said segments.

After the bars 7 have been set for an amount to be totalized, indicated, and printed, they are locked in their set positions by pawls 65 pivotally mounted upon a transverse shaft 66 and formed with locking noses 67 arranged to engage the toothed locking plates 68 mounted upon the respective slide 7. A rocking frame 69 is journaled upon the shaft 66 and is provided with a series of adjustable bolts 70 arranged to engage the rear edges of the pawls 65 when the frame is forced forward and thus force the noses 67 of the pawls into engagement with the toothed plates 68 to lock the bars in their adjusted positions. In order to hold the pawls 65 to simultaneous movement with the frame 69 and still permit of the independent adjustment of the pawls by the bolts 70 I provide said frame with a series of coil springs 71, mounted in suitable sockets formed therein, and engaging lugs 72 formed on the respective pawls. The frame 69 is given its rocking movements by means of an arm 73 rigid therewith and carrying an antifriction roller 74 at its upper end. This roller projects into a cam groove 75 formed in a box cam 76 which is mounted upon the rotation shaft 40, as best shown in Fig. 8. The formation in the cam groove 75 is such that upon the initial movement of the operating handle the pawls 65 are all disengaged from the rack plates 68 thus leaving the bars 7 free to be set. After the bars have been set according to the values of the keys operated the frame 69 is rocked forward thus causing all of the pawls 65 to engage their respective rack plates and lock the rack bars 7 in position. The bars 7 thus remain locked until the succeeding operation of the machine.

*The indicating mechanism.*—Each of the bars 7, including those of the special key banks, is formed with a horizontal slot 77. Each lever 10 is provided at its forward end with a headed pin 78 which projects through its respective slot 77. The rear upper end of said lever 10 is provided with a similar headed pin 79 which projects through an elongated notch 80 formed in an off-set of its respective indicator rack bar 11. This bar is suitably mounted in the main frame so that it will slide vertically therein and is provided at its upper end with a series of gear teeth 81 which mesh with a pinion 82 fast to its respective indicator 12. The lever 10 is further provided with an anti-friction roller 13. This roller projects through a vertical slot 83 formed in a tie bar 84 which connects the main rotary shaft 40 and the auxiliary rotary shaft 40ª mounted in the main frame above the same and geared thereto by intermeshing gears 40ᵇ and 36ª, as best shown in Fig. 7. Two cams, 85 and 86, are mounted on the respective shafts in such manner as to both engage the roller 13 when the parts are in their normal positions, shown in Fig. 5. Upon the initial movement of the crank handle both of the cams 85 and 86 are moved free of the roller 13 so that the lever 10 can rise or fall freely. When the bar 7 connected to the lever, is first forced downward to return the parts to their normal positions, the roller 13 will descend in front of the abrupt shoulder of the cam 86. When the bar 7 is subsequently elevated after a new registration, the roller 13 will be correspondingly elevated. After the bar 7 has been set and locked in position the pin 78 becomes the fulcrum of the lever 10. The further operation of the machine causes the cam 85 or the cam 86 to force the roller 13 to its normal locked position. During this operation of the roller 13 the lever 10 is being turned upon the fulcrum 78 and its rear end thus actuated to move the bar 11 a greater or less distance to adjust its corresponding indicator accordingly. Should an indicator be, say, in a position to indicate "5," and a "9" key is operated, the indicator will not be returned to its normal position, but will be moved directly from the "5" position to the "9" position.

It will be seen from the above that either one or the other of the operating cams for the indicator levers will engage the projections upon said levers and operate the lever according to its previous position. When one of the cams is moving the lever the other cam performs the office of an overthrow device and prevents the lever, when it reaches its neutral position, from moving past the same.

From the above description it will be seen that the rack bars 7 and 11 are members of a couple which are always connected by the lever 10, the member 7 of said couple being first positioned upon the operation of the machine and by its position controlling the extent of movement imparted to the other member 11 of the couple.

It will be seen by reference to Figs. 1 and 2 that the amount indicators 12 are arranged in two groups for indicating to both the back and front of the machine. As the rack bars 11 are arranged to actuate only one of its groups of indicators it becomes necessary to provide means for coupling the respective indicators of the two groups so that they will move together. This is accomplished in the following manner: The units-of-cents indicator is provided with a gear wheel 87, best shown in Figs. 1 and 2. This gear meshes with a pinion 88, fast upon a transverse shaft 89, which shaft is provided at its opposite end with a similar pinion 90. This pinion 90 meshes with a gear 91, fast to the companion units-of-cents indicator 12ª arranged at the opposite end of the machine. The tens-of-cents indicator 12 is provided with a gear wheel 92 which meshes with a pinion 93 fast to a transverse shaft 94. This shaft is provided near its opposite end with a pinion 95 which meshes with a gear wheel 96 fast to the tens-of-cents indicator 12ª near the opposite end of the machine. The units-of-dollars indicator 12 is provided with a gear wheel 97 which meshes with a pinion 98 fast to a sleeve 99, which is journaled upon the shaft 94 and is provided at its opposite end with a similar pinion 100 meshing with a gear 101 fast to the companion units-of-dollars indicator. Both of the tens-of-dollars indicators 12 and 12ª are mounted fast upon the indicator shaft 43 so as to be simultaneously adjustable. The two clerks' indicators 12 and 12ª are mounted upon the opposite ends of a sleeve 102 which is journaled upon the aforesaid shaft 43. The special indicator 12ᶜ for indicating the special transactions, such as "charge," "received-on-account," "paid out," and "cash," is journaled upon the shaft 43 and is provided with two series of characters or words which are so arranged thereon as to indicate properly to both the back and front of the machine. For this purpose the special indicator may be said to be divided into two sections, one of which is about twice the width of the other, whereby a much larger and more prominent indication may be made to the front of the machine, as shown in Fig. 1. This construction is practicable because this large extended portion of the indicator projects over the back of the indicators indicating at the opposite side of the machine and out of the path of any of the operating parts.

It will be seen from the foregoing description that the indicating mechanism is arranged to indicate the character of the transaction, a designating mark for the clerk making the transaction, and the amount of the transaction, at both front and back of the machine.

*The guard or flash devices.*—In order to prevent any reading of the indicators during the time the same are being moved or adjusted, I provide two flash plates 44 arranged to conceal the indicators at the opposite sides of the machine. The levers 36 are connected at their rear ends to link bars 41 which are in turn connected to pivoted levers 42 journaled upon the indicator shaft 43 and connected at their outer ends by the flash plates 44 arranged to obscure the indicators at both the back and front of the machine. Just as soon as the racks 4 are brought into mesh with the segments 5 the flash plates 44 are moved into position to obscure the indicators and are not withdrawn from these positions until the racks and segments are again disengaged.

*The totalizing or registering mechanism.*— As before stated, each of the bars 7, excepting of course the bars relating to the clerk's bank and the special keys bank, is provided with a rack bar 8. When the bar 7 is adjusted according to the value of the key operated, as before described, a greater or less number of the teeth of the rack 8 are brought into a plane that is normally traversed by the totalizer 9 when the same is moved downward in the manner above described. The positions of the bars 7 are such that the rack plates or extensions formed with the teeth 8 must be off-set or moved into closer relation with each other in order to bring them into the proper positions to coöperate with the totalizer pinions. The registering mechanism shown in the present case is fully illustrated and described in my Patent No. 751,611 dated Feb. 9, 1904, and is peculiar in that the totalizer comprising the registering wheels 103 is mounted in a movable frame which is given a definite and constant movement or excursion every time the crank is operated. The operating rack bars are adjusted, as before described, to the proper registering positions and are held immovable during the time the register or totalizer is being moved over the same. The totalizer is first thrown rearward so that the totalizer pinions are in line with the teeth of the rack bars and is then given a downward movement so that the registering wheels will be turned by their passage over the rack teeth. When the totalizer has reached the limit of its downward movement it is thrown forward out of engagement with the rack teeth and while thus disengaged it is returned upward to its normal position. During this return movement the transfer from one wheel to another is effected. The aforesaid totalizer 9 comprises a frame 104, a transverse totalizer shaft 105 mounted therein, and the totalizer or registering wheels 103 mounted on said shaft. Each of the wheels 103 is formed on its periphery with a series of numerals from "zero" to "nine" and is provided with a pinion 107, a ratchet wheel 108, and a transfer tripping pin 109. The ratchet wheels 108 are engaged by spring retaining pawls 110 which are mounted upon the transfer shaft 111 of the totalizer frame. (See Figs. 11 and 12.) The transfer pins 109 are so located on the totalizer wheels that after a wheel has made a complete revolution its respective pin will engage a nose 112 formed on its respective trip pawl 113. These pawls are all mounted upon a transverse shaft 114 and are held in their normal positions, shown in Fig. 12, by coil springs 115 which connect them to transfer-pawl carrying levers 116 which are pivoted upon a transverse shaft 117. The forward end of each of the pawls 113 projects through an aperture 118 formed in a plate 119 of the counter frame. The lower wall of the aperture 118 forms a stop for limiting the movement of the pawl. The rear end of each of the pawls 113 is formed with two shoulders 120 and 121 which are adapted to form stops for a lug 122, mounted upon the transfer pawl 123. These transfer pawls are pivoted upon their respective levers 116 and are normally drawn forward by coil springs 124 which connect them to the plate 119. Each of the pawls 123 is provided with a forwardly extending arm 123$^a$ which is provided in turn with a pin 123$^b$ which forms a stop to abut against the lower edge of its respective lever 116 to limit the rearward movement of the transfer pawl during its operation and thus preventing any overthrow of the counter wheel when the same is being actuated by the pawl.

When one of the totalizer wheels has made a complete revolution its pin 109 contacts with a nose 112 and forces the pawl 113 downward to disengage the shoulder 121 from the lug 122 and thus permit the pawl 123 to spring forward into position to engage its respective ratchet wheel 108 and move the same forward one tooth when its transfer lever 116 is operated. When one of the transfer pawls 123 has been released in the manner above described it is reciprocated by its lever 116 upon the upward movement of the counter and after the regular registering operation of the machine. When after being tripped, as above described, the transfer pawl is operated and is swung rearward by its engagement with the teeth of the register wheel, in a manner well known in the art. Just as the transfer pawl reaches the upper limit of its movement, it has moved free of the trip pawl and the latter is allowed to swing upward so as to again pass in front of the transfer pawl and hold it in inoperative position. The forward end of each of the levers 116 is provided with an anti-friction roller 126, which, when the totalizer frame is moved upward, as hereinafter described, contacts with one of a series of progressively arranged cam flanges 127 formed on the main frame. By this means the forward ends of the levers 116 are successively cammed to the rear thus actuating the transfer pawls successively to effect the transfer. When the parts are in their normal positions shown in Fig. 5, all of the transfer pawls are slightly advanced by the cam flanges 127, which have slightly advanced the pawl carrying levers, so that should the totalizer wheels be rotated while in this position, the transfer pawls upon being released will simply engage the rear sides of the teeth of the ratchet wheels and the trip pawls will settle back to locking positions when released. Just as soon, however, as the totalizer starts its downward movement the forward ends of the levers 116 are freed and move upward slightly thus moving the transfer pawls down sufficiently to permit them to pass in front of the operating faces of the succeeding teeth of the ratchets should the trips be then operated by the regular operation of the counter wheels.

The object of the above construction is to prevent the transfer pawls being moved into operative position during the time the counter wheels are being turned to zero. The transfer mechanism above described relates to the wheels of the totalizer which receive motion from the operating rack teeth 8 but as the capacity of the totalizer is such as to include totalizer wheels that do not mesh with any of the rack teeth 8, it is necessary to provide auxiliary transfer devices for effecting the transfer between these additional wheels. These devices, which are plainly shown in Fig. 11, consist of a transfer pawl 128 mounted upon the right-hand lever 116 and having a number of operating fingers or tines 129 of different lengths. These tines coöperate with deep notch ratchet wheels to effect a successive transfer in a manner well known in the art. The pawl 128 coöperates with its tripping pawl substantially in the same manner as above described except that it is provided with an arm 130 which engages its tripping pawl as plainly shown in Fig. 12.

The totalizer frame carrying the totalizer wheels is slidably mounted in a rock frame 131 which is pivoted upon the main frame and is formed with vertical guiding grooves 132 into which project anti-friction rollers 133 which are mounted upon the sides of the counter frame. Lateral movement of the totalizer frame is prevented by flanges 134 which lap over the edges of the slots 132 whereby the totalizer frame is permitted only a vertical movement. The totalizer is given a constant and definite vertical travel within the rock frame upon each operation of the crank handle. This result is effected by means of a totalizer reciprocating lever 135 which is pivoted at its rear end to the main frame and is slotted at its forward end to straddle a rod 136 which connects the lower ends of the counter frame plates. The lever 135 is provided with an anti-friction roller 137 which projects into a cam groove 138 formed in a box cam 139 which is mounted upon the rotation shaft 40. It results from the above that upon each rotation of the shaft 40 the totalizer frame is moved first downward and then back to its normal upper position. In addition to the above the frame 131 is first rocked rearward and then subsequently forward to its normal position. This rocking of the frame 131 is accomplished by means of a link bar 140 which is slotted at its rear end to straddle the shaft 40 and is provided with an anti-friction roller 141 which projects into a cam groove 142 formed in a box cam 143, fast to said shaft 40. The formation of this box cam is such that the link bar is given one reciprocation upon each operation of the machine. The forward end of the link bar is formed with an elongated slot 144 into which projects a pin 145 projecting laterally from the rocking frame 131. The pin 145 is normally latched to move with the bar 140 by a pivoted latch 146 which is mounted on said bar and is formed with a hook 147 which engages the pin 145, as shown in Fig. 6. The hook 147 is normally held in engagement with the pin 145 so that the frame 131 will move with the bar 140 by one arm 148 of a lever 149 which is mounted upon a transverse shaft 150. The arm 148 engages a pin 151 which is mounted upon the pawl 146 to normally hold the latter in position. The lever 149 is formed with an upper hook arm 152 which, when the shaft 150 is rocked, is arranged to pass down over the pin 145 and thus lock the frame 131 in its forward position. The shaft 150 is rocked to secure this result in the following manner: Fast to one end of said shaft is an operating arm 153 formed with an angular slot 154 into which a pin 155 projects. This pin is mounted upon the upper end of an arm 156 which is fast to the segment 6 of the bank of keys relating to the special transactions. Whenever the segment 6 of this special bank is rocked forward following the operation of one of the special keys, the arm 156 also rocks forward and the pin 155 engaging the cam walls of the slot 154 forces the forward end of the arm 153 upward and thus rocks the shaft 150 to engage the hook 152 with the pin 145 and disengage the pawl 146 from the pin 145. The subsequent operation of the crank handle will then result in the free movement of the link bar 140 without affecting the rock frame 131. As the rock frame is not moved to its rear position the totalizer pinions of course do not engage the rack teeth 8 and no registration takes place. The totalizer shaft 105 is provided at one end outside of the rock frame 131 with a locking disk 157 formed with a flat side 158 which, when the totalizer is moved downward, passes in front of a flange 159 formed on the rock frame and thus prevents any turning of the totalizer shaft 105 after the totalizer frame has been moved from its normal position. The shaft 105 is provided near its end with a notched collar 160 whereby a key may be applied thereto to rotate it and thus turn the counter wheels to zero. Suitable spring pressed pawls 160ª are mounted on the counter wheels and are arranged to engage a longitudinal groove formed in the shaft 105 whereby, when the latter is operated, the counter wheels are picked up and returned to a common zero position. The disk 157 is provided with a pin 161 which, when the counter shaft is rotated, contacts with a stop pawl 162 (see Fig. 6) after the shaft has made a complete rotation and thus arrests the totalizer wheels in their zero positions. The pawl 162 is pivotally mounted upon the rock frame 131 and is normally forced rearward into the position shown in Fig. 6 by a spring 163 which is wound about its pivot pin 164 and bears with one end against the frame 1ª and the other against a projection 165 of the pawl. The pawl 162 is formed with a stop arm 166 which, when the pawl is forced forward, contacts with the edge of the frame 131 and thus limits the movement of the pawl in this direction. After the totalizer has been turned to zero, as above described, the pin 161 will lie to the right of the pawl 162. When the totalizer is subsequently moved downward the pin will disengage from the pawl and the latter will thus assume its normal position so that when the totalizer frame moves up again the pin 161 will occupy its normal position to the left of the pawl leaving the totalizer shaft free to be rotated to turn the totalizer wheels to zero when desired.

It will be seen from the above description that the rack bars 7 are first set, the rock frame 31 then rocked rearward to bring the totalizer pinions into the same vertical planes with the rack teeth 8, the totalizer then moved downward over the rack teeth and thereby operated, the frame 131 then rocked forward and the totalizer thereby returned to its upper normal position; the transfer taking place as the totalizer moves upward. The construction of the operating link rods and box cams is such that when the totalizer reaches the lower limit of its travel it is not immediately moved out of connection with the rack bars but a sufficient interval of rest occurs to insure the absolute termination of the rotary movement of the totalizer wheels before they are moved out of mesh with the rack bars.

*Printing mechanism.*—As before stated, each of the segments 6 is formed with a series of printer operating rack teeth 47. These teeth mesh with pinions 167 that are mounted upon the inner ends of a series of nested sleeves 168 and a shaft 169 which supports said sleeves. Mounted upon the opposite ends of the sleeves and the shaft are the type wheels 14. These wheels are formed with double series of types located upon diametrically opposite sides of the same whereby an impression of the amount and other characters may be taken both from the top and bottom of said wheels. The upper printing line is utilized for printing upon the detail strip while the lower printing line is a medium for the printing of the check. Each of the type wheels is provided with a toothed alining disk 168ª fast thereto. These disks are arranged to be engaged by a series of alining pawls 169ª. These pawls are formed upon a plate 170 which is pivoted upon a transverse shaft 171. Two arms 172 and 173 project from the plate 170 and are actuated by pins 174 and 175 fast to the printing roller 176, which is journaled upon the printer frame. The roller 176 carries a cam disk 177 which is arranged to engage a pin 178 projecting from the arm 173. During the proper period of the rotation of the cylinder 176 the pin 178 is engaged by the cam disk 177 and thereby forced downward to cause the pawls 169 to engage and lock the type wheels. After the impression has been made from the type wheels the same are unlocked, as shown in Fig. 3, by the enlarged portion of the cam disk 177 passing free of the pin 178. Pins 174 and 175 traverse the arm 172 and thus hold the pawls 169ª out of engagement with the toothed disks 168ª until the proper time is reached for again locking the type wheels. The devices for feeding the detail and check strips and for cutting off the latter are controlled from the rotation shaft 40. For this purpose the shaft is provided with a gear 179 which meshes with a pinion 180 mounted fast upon the short rotation shaft 181 which is journaled at one end in the main frame and at the opposite end in a sleeve 182 which is in turn journaled in the printer frame. (See Fig. 4.) This sleeve is provided with a pinion 183 which meshes with a gear 184 mounted on the end of the printing cylinder 176. The gear 184 meshes with a similar gear 185 mounted upon the end of the impression and feeding roller 186 which is journaled on the main frame. The shaft 181 is normally coupled to the sleeve 182 by a pin 187 which projects laterally from the shaft into a notch 188 formed in the end of the sleeve. The parts are held in this coupled position by a bolt 189 mounted transversely to the sleeve 182 and projecting laterally therefrom into engagement with an annular cap 190 mounted on the printer frame and formed with a radial slot 191. The bolt 189 is provided with a laterally projecting pin 192 extending into a diagonal slot 193 formed in a spring pressed operating plate 194. This plate is mounted on the sleeve 182 and is normally forced toward the outer end of the sleeve by a coil spring 195 which engages the disk 196 mounted on the rod 197 extending from the plate and the shoulder 198 formed on the sleeve. A knob 199 is mounted fast on the outer end of the sleeve 182 and is formed with a central aperture through which projects a plunger stud 200 mounted on the plate 196. By reference to Fig. 3 it will be seen that the teeth of the pinion 183 are unobstructed for lateral outward movement when the parts are in their normal positions, as shown. When the parts are moved from such normal positions by rotation, however, the enlarged portion of the cam 177 will overlap the teeth of the pinion and thus prevent any lateral movement of the same. When it is desired to uncouple the sleeve 182 from the shaft 181 the stud 200 is forced inward thus drawing the bolt 189 downward and disengaging it from the cap 190. The knob 199 is now drawn outward to disengage the sleeve from the pin 187. Upon the plunger 200 being released the bolt 189 passes up outside of the cap 190 and thus prevents the return of the sleeve 182 to its normal coupled position. It will be observed that the action of the spring 195 automatically returns the bolt 189 to its normal position when pressure upon the stud 200 is removed. When the sleeve 182 is drawn outward in the manner above described, the operation of the printing cylinder ceases, and as this cylinder also controls the movement of the roller 186, all feeding of the check strip also stops. In addition to the above the lower platen is also rendered inoperative by this adjustment. This platen is mounted upon a lever 202 and is provided with an anti-friction roller 203 which projects into a cam groove 204 formed in a box cam 205 which is carried by the roller 186. The check strip is led from a supply roller 206 down through a chute 207 and forward between the printer roller 176 and the pressure roller 186. The check strip passes forward over the platen 201, through an opening in a stationary knife blade 208, and over a pivoted knife blade 209. This latter blade, as best shown in Fig. 1, is formed at its inner end with an elongated slot 210 into which projects a pin 211. This pin, as best shown in Fig. 10, is mounted in a short link 212 pivoted to the front of the lever 213. The rear end of this lever is provided with an anti-friction roller 214 which projects into a cam slot 215 formed in a box cam 216 fast to the shaft 40. By this means the movable knife blade is oscillated once upon each operation of the machine and severs the check strip which has been fed between it and the stationary blade.

Any suitable form of ink roller, such as 217, may be provided for inking the types on the cylinder 176. This cylinder preferably contains dating and consecutive numbering types. The platen roller 218 for the detail strip is mounted upon the forward end of the lever 219 which is pivoted upon the printer frame, and receives motion from a lever 220 also pivoted upon the printer frame, and connected to the first mentioned lever by screw bolts 221 whereby the relative positions of the two levers may be adjusted. The rear end of the lever 220 is provided with an anti-friction roller 222 which projects into a cam slot 223 formed in a box cam 224, which is fast to the shaft 40. It results from the above that the lever 219 is oscillated twice upon each operation of the machine in a similar manner to the platen 201. The first oscillatory movements of the platens is for pressing the ink pads 225 against the types on the printing lines. These ink pads are carried by pivoted spring pressed arms 226 mounted upon levers 227. One of these levers is made fast to one end of a short sleeve 168ª (see Figs. 1 and 16,) the other end of which carries a pinion 168ᵇ; this pinion is operated by a rack bar 228 which is slotted at its rear end to straddle the shaft 40 and is actuated by a box cam 229 mounted thereon. The formation of the cam 229 is such that the ink pads are first brought to the printing line and then subsequently moved away from the line so that the two platens may force the detail strip and the check strip against the ink types. The detail strip passes from a supply roller 230 mounted on the main frame, about the platen roller 218, and to a winding roller 231, which is mounted upon said lever 219. This winding roller 231 is provided with a milled disk 232 which is fast thereto and is engaged by a spring pressed feeding pawl 233. This pawl is mounted upon an arm 234 which is journaled upon the lever 219 and is connected to the main frame by a link bar 235. It results from the above construction that when the lever 219 is operated the arm 234 is drawn upward and then as the lever 219 is returned to its normal position the arm 234 is forced downward whereby the pawl 233 rotates the disk 232 and winds the detail strip upon the roller 231. A spring pressed retaining pawl 236 is mounted upon the lever 219 and engages the disk 232 to prevent any retrograde movement of the same.

It will be observed from the above description that the detail printing devices are continually operative while the check printing devices may be discontinued at will by simply disconnecting the shaft 182 from the shaft 181.

As many of the parts of the present printer are covered by the patent above mentioned, they have not been described in minute detail a general description of the parts only having been given.

*Main operating gearing.*—The crank handle 237 is journaled upon a stud 238 mounted on the main frame and is provided with a pinion 239 which meshes with a gear 240 also journaled upon the main frame and meshing in turn with the gear 36ª which is fast to the shaft 40. As before stated, the gear 36ª meshes with a gear 40ᵇ and this gear carries a locking disk 241 formed with a locking notch 242 and provided with a trip pin 243. A spring drawn locking pawl 244 is suitably mounted upon the main frame and is provided with a beveled nose 245 arranged to project into the locking notch 242. The pawl 244 is formed with a stop arm 246 and a trip arm 247. When the parts are in their normal positions shown in Fig. 7, the machine is locked and in order to unlock it, it is necessary to first force the handle 237 slightly to the rear. This operation disengages the pawl 244 from the inclined wall of the notch 242 and permits the pawl to be drawn by a coil spring 248ª into a position in which it will not be engaged by the wall of the notch 243 when the handle is again moved forward. The machine is then operated. As the disk 241 approaches the end of its movement the pin 243 engages the arm 247 and again forces the pawl 244 into engagement to arrest the movement of the machine.

*The locking devices for the operating mechanism.*—In machines of the type herein shown it is very desirable to lock the mechanism against any operation until after some one of the clerk's keys has been operated. To accomplish this result is provided the key-board with a pivoted lever 249ª located immediately below the inner ends of the key shanks of the special clerks' keys. It results from this construction that when any one of the clerks' keys is forced inward it contacts with and operates the lever 249ª. This movement of the lever is utilized to unlock the machine through the medium of a link bar 250ª which is pivotally connected at its forward end to said lever, and at its rear end is similarly connected to a bell crank lever 251ª which is pivoted upon the shaft 66 and is normally rocked forward into the position shown in Fig. 8, by a spring 252ª which surrounds the shaft and bears with its opposite ends,—one against said bell crank lever, and the other against a portion of the main frame. The upper or elongated arm 253 of the bell crank lever normally projects into a position to intercept a locking projection 254, fast to the shaft 40. When the bell crank lever 251 is operated, however, by the depression of one of the clerks' keys, the arm 253 is forced so far to the rear as to pass free of the stop 254 and thus leave the shaft 40 free to rotate. When the clerk's key is released in the manner heretofore described, the parts assume their normal locking positions and the machine is arrested after the crank handle has made two complete revolutions.

*General description.*—From the foregoing it will be observed that the depression of the keys set certain parts to a degree corresponding to the values of the keys operated and that these setting movements are subsequently utilized to secure the desired registration by returning the set parts to normal fixed positions. It will be further seen that each of these second graduated movements accomplished by the return of the originally set device to its normal position is utilized to determine the position of the fulcrum of a lever; which lever is connected to the indicating devices. After the fulcrum of this lever has been determined, a projection mounted on the lever is moved to a certain fixed point and the lever thus given a movement dependent upon the adjusted position of its fulcrum. In practice the indicators and their operating racks are all constructed sufficiently tight in their bearings to require a positive force to operate them. For instance; should a certain indicator wheel be set to indicate "9," the initial movement of the operating handle upon the next succeeding operation of the machine will release the indicator by the cams 85 and 86 passing free of the roller 13 but the indicator will not ordinarily move away from the "9" position until it is actually forced to do so by the lever 10. Should the indicator be at "9" and another transaction including "9" be then registered the indicator will not move from its indicating position at all. Should the indicator, however, be indicating "9" and a subsequent transaction of "6" registered, the indicator will only move back three degrees and will not, as is usual in a number of machines at present in use, move entirely back to zero position and then move forward to take up its new position. This construction results in a great saving in the wear of the different parts for actuating the indicators and in preventing all tendency to over-throw in any parts of the machine for actuating the counter as the setting movement of the indicators and the momentum of the same have no effect upon the setting movement of the counter operating elements. In fact the counter operating elements are set and locked before the operation of the indicator operating devices has commenced.

It will be observed that the keys of the machine shown are adapted to differentially position movable elements which themselves serve to differentially actuate adding counter or totalizer controlling racks. The movable elements and totalizer controlling racks therefore form primary and secondary positioning devices. It will be clear that although there are shown in this case banks of keys which serve to positively move the primary positioning devices differentially the invention is not limited to the use of this type of keys, as any other known devices in the art for producing directly or indirectly, a differential positioning of said devices are comprised in the invention, broadly stated. It is therefore desired that the claims should not be limited to the type of keys and positioning elements shown, but may include other means, as pointed out above, and may be construed broadly except as limited by the prior art.

It will be seen that the construction herein described and shown, is well calculated to thoroughly fulfil the objects primarily stated. At the same time it is to be understood that the invention here described is susceptible of embodiment in many other forms which will be more or less obvious to those skilled in the art; hence in the claims which follow essential elements are recited without limitations to details of construction.

The invention which relates to the character of means for positioning identifying devices in a cash register or analogous machine in such manner as to obviate restoration to zero in each operation, does not at all depend upon the exact function which the identifying devices perform; and while these identifying devices are termed "indicators" in the claims, this is not to be taken in a limited sense as meaning specifically display devices or targets for it will be perfectly obvious that they might be set at different positions for other purposes such for example as the taking off of impressions.

By the term digit carrier as used in some of the claims it is intended to cover any form of device bearing a plurality of characters, such as, an indicator, a type carrier or a registering element of a totalizer, regardless of whether such device returns to a normal starting point in moving from one position to another, whether it moves from one position to another in either direction without returning to a normal starting point or whether it is moved continuously in one direction.

Having thus described my invention, what I claim as new and desire to secure by Letters Patent is:

1. In a machine of the character described, the combination with an indicator having a plurality of insignia and movable back and forth to different positions for display of the same severally; of manipulative means movable independently of said indicator for determining the particular insignia to be displayed in an operation of the machine, and intervening operating mechanism with provisions for positively moving said indicator directly from one indicating position to another in either direction without return movement to a normal starting point.

2. In a machine of the character described, the combination with an indicator having a plurality of insignia and movable back and forth to different positions for display of the same severally; of manipulative means movable independently of said indicator for determining the particular insignia to be displayed in an operation of the machine, and differentially adjustable intervening operating mechanism with provisions for positively moving said indicator directly from one indicating position to another in either direction without return movement to a normal starting point.

3. In a machine of the character described, the combination with an indicator having a plurality of insignia and movable back and forth to different positions for display of the same severally; of manipulative means movable independently of said indicator for determining the particular insignia to be displayed in an operation of the machine, indicator operating means constant in character, and coöperating means adjustable under control of said manipulative means to partake more or less of the movement of said constant means; provisions existing by virtue of which the indicator may be moved directly from one indicating position to another in either direction without return movement to a normal starting point.

4. In a cash register, the combination with a primary setting element, of means for restoring the same to normal position after displacement, an indicating element, secondary setting means intermediate the actuating and indicating elements and operated by the former, and devices for independently operating said intermediate means after the same have been set by the actuating means whereby to set the indicating element.

5. In a cash register, the combination with a setting element, of an indicator, totalizer operating means controlled by the setting element, a device intermediate the totalizer operating means and the indicator and arranged to be set by the former, and an independent actuator for said device for moving the latter to actuate the indicator while the totalizer operating means are stationary.

6. In a cash register, the combination with a totalizer, of an operating mechanism for the same arranged to be moved different distances, an indicator, means intermediate the indicator and operating mechanism arranged to be set by the latter, and independent devices for operating said intermediate means to set the indicator after the movements of the totalizer operating mechanism have ceased.

7. In a cash register, the combination with a differentially movable element, of a totalizer operating element actuated by said movable element to an extent in direct proportion to the degree of movement of the same, an indicator, and means controlled as to extent of movement by the said totalizer operating element when in fixed position for moving said indicator.

8. In a cash register, the combination with a setting element, of keys for positively actuating the same, a totalizer operating member actuated according to the degree of movement of the setting element, means for operating the totalizer actuating member after the setting element has been positioned and to an extent directly in proportion to the movement of the setting element, and a totalizer coöperating with the said totalizer operating element.

9. In a cash register, the combination with a setting element, of a totalizer operating element, independently and positively operated means intermediate the setting element and totalizer operating element whereby the latter is actuated to an extent directly proportional to the extent of setting movement of the setting element, and a totalizer coöperating with the totalizer actuating element.

10. In a cash register, the combination with a series of setting elements, of a series of keys for actuating the same, a series of totalizer operating members, means intermediate the setting elements and totalizer operating members for intermittently connecting the same, a totalizer, and devices for actuating the intermediate means when in disconnected condition.

11. In a cash register, the combination with a series of setting elements, of a series of keys for moving said elements differentially, a series of rack segments arranged to be connected with and disconnected from the setting elements, a series of totalizer operating devices connected to said segments, and a totalizer coöperating with said devices.

12. In a cash register, the combination with a series of setting elements, of a series of keys for actuating the same differentially, a series of racks movably connected to the setting elements, a series of totalizer operating devices coöperating with the movable racks, means for actuating said totalizer operating devices independently of the movable racks, and a counter coöperating with the totalizer operating devices.

13. In a cash register, the combination with a series of setting elements, of a series of keys for operating the same differentially, pivoted rack bars connected to said setting elements, a series of totalizer operating devices, means for connecting and disconnecting the rack bars therewith, a totalizer, and means for actuating the totalizer operating devices when they are disconnected from the rack bars.

14. In a cash register, the combination with a series of setting elements, of a series of keys for operating the same, a series of pivoted rack segments, movable rack bars connected to the setting elements, means for moving the rack bars into and out of connection with the rack segments, a series of counter operating elements connected to the rack segments, and a counter coöperating with said operating elements.

15. In a cash register, the combination with a series of setting elements, of a series of keys for operating the same, a series of indicators, a series of pivoted levers for operating the indicators, means intermediate the setting elements and pivoted levers for positioning the fulcra of the latter, and means for operating the pivoted levers after their fulcra have been determined.

16. In a cash register, the combination with a differentially movable setting mechanism, of a differentially movable indicator, means intermediate the setting mechanism and indicator and arranged to be adjusted by said mechanism without operating the indicator, and devices for subsequently operating said intermediate means independently of the setting mechanism to actuate the indicator.

17. In a cash register, the combination with a setting mechanism, of a series of rotary indicators, connecting elements intermediate the setting mechanism and indicators including levers, means for positioning the fulcra of said levers, and means for independently operating said levers after the position of their fulcra has been determined by the setting mechanism.

18. In a cash register, the combination with a setting mechanism, of a counter, a series of indicators, counter operating devices controlled by the setting mechanism, pivoted indicator-operating elements also connected to the setting elements, means for positioning the fulcra of said elements, and means for operating said pivoted elements after the position of their fulcra has been determined by the setting mechanism.

19. In a cash register, the combination with a setting mechanism, of a totalizer operating member connected thereto, a totalizer, an indicator, a pivoted element intermediate the member and indicator given differential adjustment by the former, and means for independently actuating said pivoted element to set said indicator.

20. In a cash register, the combination with a setting element, of a series of keys for operating the same differentially, a totalizer, a totalizer operating element, means for bringing the totalizer operating element and the setting element together, and devices for subsequently positively returning the setting element to its normal position whereby to set the totalizer operating element.

21. In a cash register, the combination with a series of keys, of a series of levers actuated thereby, movable racks carried by said levers, a series of oscillatory rack segments, means for bringing said racks and rack segments together and again separating them, and a totalizer and connections controlled by the rack segments.

22. In a cash register, the combination with a series of keys, of a series of levers operated thereby, a setting mechanism controlled by said levers, a series of indicators, indicator operating levers the position of the fulcra of which is determined by the setting mechanism, and means for actuating said indicator operating levers after the position of their fulcra has been determined.

23. In a cash register, the combination with a setting mechanism, of a series of indicators, a series of levers connected to the setting mechanism and to the indicators, and cams arranged to move a certain part of said levers to a regular arresting point upon each operation of the machine.

24. In a cash register, the combination with a series of keys, of a series of levers actuated thereby, a series of pivoted rack bars connected to said levers, a series of pivoted segments controlled by the rack bars, totalizer operating elements connected to the segments, and a totalizer coöperating with said elements.

25. The combination with a setting mechanism, of an indicator, a lever, means intermediate the setting mechanism and lever for changing the position of the fulcrum of the latter, and means for operating said lever after its fulcrum has been determined.

26. In a cash register, the combination with a series of movable setting elements, a series of keys for moving said elements different distances, totalizer operating devices, a totalizer, means for bringing the totalizer operating devices and movable setting elements together, and independent means for subsequently returning the latter to their normal positions and thus actuating the totalizer operating devices.

27. In a cash register, the combination with a series of levers, of a series of keys for differentially operating said levers, racks carried by said levers, a series of totalizer operating elements, a totalizer, means for bringing the racks into connection with the totalizer operating elements, and independent means for returning the levers to their normal positions and thus actuating the totalizer operating elements.

28. In a cash register, the combination with a series of levers, of a series of plunger keys for operating said levers differentially, a series of racks connected to said levers, totalizer operating devices, a totalizer, means for coupling the totalizer operating devices and racks, and means for subsequently returning the levers to their normal positions and thus actuating the totalizer operating devices.

29. In a cash register, the combination with a series of operating elements, of a series of keys for moving said elements differentially, a series of totalizer operating devices, a totalizer, means for bringing the operating elements into connection with the totalizer operating devices, and means for subsequently positively returning the operating elements to their normal positions, whereby to move the totalizer operating devices differentially.

30. In a cash register, the combination with a series of levers, of a series of keys for differentially operating the same, racks connected to said levers, counter operating racks, means for coupling the two series of racks together, a totalizer, and devices for returning the levers to their normal positions after the racks are coupled.

31. In a cash register, the combination with a series of levers, of a series of keys for operating the same differentially, racks pivoted to said levers, a series of pivoted rack segments, means for bringing the pivoted racks into engagement with the pivoted rack segments, totalizer operating devices connected to the rack segments, a totalizer, and means for returning the levers to their normal positions after the racks and rack segments are coupled together.

32. In a cash register, the combination with an operating mechanism, of a series of keys for setting said mechanism, totalizer operating racks connected to said mechanism, a totalizer mounted in a frame and movable over said racks, and an operating handle for positioning the racks according to the values of the keys operated.

33. In a cash register, the combination with a series of keys, of a series of totalizer operating racks, an operating handle and connections for positioning the racks according to the keys operated, a totalizer mounted in a movable frame, and means for drawing the totalizers over the positioning racks and thereby operating the same.

34. In a cash register, the combination with an operating mechanism including totalizer operating racks, a series of keys for determining the movement of said racks, an operating handle for actuating the racks according to the values of the keys operated, a sliding frame and a totalizer mounted therein and constructed to be drawn over the racks and thereby cause operation of the totalizer, and means intermediate the operating handle and the sliding totalizer frame for operating the latter.

35. In a cash register, the combination with a series of levers having graduated contacting surfaces, a series of keys arranged to engage and operate said levers, racks connected to the levers, totalizer operating elements, a totalizer, operating means intermediate the racks and the totalizer operating elements, devices for engaging said racks with said means, and mechanism for returning the levers to their normal positions during such engagement.

36. In a cash register, the combination with a series of levers, of a series of keys arranged to operate said levers, a series of totalizer operating elements, a totalizer, means for moving the totalizer into coöperative relation with the operating elements, and devices intermediate one of said levers and said means for rendering the latter ineffective when one of the keys relating to said lever is operated.

37. In a cash register, the combination with a series of levers, of a series of keys for operating the same, a series of totalizer operating elements, operating means intermediate said elements and said levers, a totalizer mounted in a movable frame, devices for operating said frame, and for giving the totalizer a translatory movement over its operating elements, and means connected to one of said levers for rendering said devices ineffective.

38. In a cash register, the combination with a series of rack bars, means for setting said bars to different positions, a totalizer movable over said bars and thereby actuated, a series of indicators, pivoted levers intermediate the rack bars and the indicators, and means for operating said levers after their fulcra have been determined by the movement of the rack bars.

39. In a cash register, the combination with a series of setting elements, of a series of indicators, pivoted levers intermediate the setting elements and the indicators, and spaced cams constructed to move the levers to a certain fixed point from either direction.

40. In a cash register, the combination with a series of setting elements, of a series of indicators, pivoted levers intermediate the setting elements and the indicators, lugs mounted on said levers, and camming devices arranged to bring said lugs to a predetermined point upon each operation of the machine.

41. In a cash register, the combination with a series of levers, of keys for operating the same differentially, racks connected to said levers, oscillatory rack segments, means for bringing the racks and rack segments together, mechanism for returning the levers to their normal positions, and printing devices controlled from said rack segments.

42. In a cash register, the combination with a series of setting elements, including vertically movable members, of a series of indicators, vertically movable actuators for the indicators, pivoted levers connecting the actuators and the movable members, and means for actuating the levers after their fulcra have been determined.

43. In a cash register, the combination with a series of operating elements, of a series of keys for moving said elements differentially, indicator operating devices, shifting means for connecting and disconnecting the operating elements with the indicator operating devices, indicators, a flash for the indicators, and means for operating the flash from the shifting devices.

44. In a cash register, the combination with a series of indicators, of flashes or guards for the same, a series of keys, pivoted levers operated differentially by said keys, racks connected to said levers, means intermediate the indicators and said racks for setting the indicators, devices for throwing the racks into and out of connection with said intermediate means, and means connecting said throwing devices to the flashes.

45. In a cash register, the combination with a series of pivoted elements, of a series of keys for differentially operating the same, racks connected to the pivoted elements, a series of pivoted segments, means for moving the racks into and out of engagement with said segments, totalizer actuating devices connected to said segments, and mechanism whereby the pivoted elements and the pivoted segments may be operated independently of each other.

46. In a cash register, the combination with a series of common operating members moved differentially, means for returning the members to their normal positions, totalizer actuating devices moved by said members upon their return movement, and independent mechanism for returning the totalizer actuating devices to their normal positions.

47. In a cash register, the combination with a series of pivoted elements, of a series of keys for operating said elements differentially, rack bars pivoted to said elements, a series of rack segments, totalizer actuating devices connected to said rack segments, a totalizer, and an operating handle and connections for returning both the pivoted elements and the rack segments to their normal positions in different directions.

48. In a cash register, the combination with a totalizer mounted in a movable frame, an operating handle, means intermediate the handle and the frame for actuating the latter, a totalizer operating mechanism, a series of special keys, a rack segment controlled by said keys, and means operated by the rack segment for breaking the connection between the totalizer frame and the operating handle.

49. In a cash register, the combination with totalizer operating devices, of a totalizer mounted in a movable frame, an operating mechanism, means intermediate the operating mechanism and the totalizer frame for actuating the latter, devices for breaking the connection between the operating mechanism and the totalizer frame including a cam arm, a series of special keys, an operating element controlled by said special keys, and means moved by the operating element for operating the cam arm.

50. In a cash register, the combination with a series of levers, keys for moving said levers differentially, racks carried by said levers, a series of rack segments controlled by said racks but normally disconnected therefrom, means for engaging said racks with said segments, means for restoring said racks to normal position and thereby setting the segments, and a series of type carriers connected to said rack segments.

51. In a cash register, the combination with a series of levers, of a series of keys for moving said levers differentially, a series of type carriers, connecting means intermediate the type carriers and the levers, an operating handle, and means connected to said handle for returning the levers to their positions after they have been set by the keys and thereby setting the type carriers.

52. In a cash register, the combination with a series of operating elements, of a series of keys for moving said elements in one direction, a series of type carriers, operating means intermediate the operating elements and the type carriers, devices controlling said means for breaking the connection during the forward movement of the operating elements and establishing such connection before the return movement of said elements, and an operating handle for returning the elements to their normal positions.

53. In a cash register, the combination with a series of levers, of a series of keys for operating the same differentially, racks connected to said levers, rack segments controlled by said racks, type carriers connected to the rack segments, totalizer operating devices also connected to the rack segments, a totalizer, and means for bringing the racks and the rack segments together so that they will move in unison.

54. In a printing mechanism for cash registers, the combination with an operating shaft, of a sleeve carrying a pinion and arranged to be coupled to said shaft, and movable devices mounted in the sleeve for securing said sleeve in its adjusted positions.

55. In a printing mechanism for cash registers, the combination with a driving shaft, of a driving sleeve arranged to be coupled thereto, an annular guide, and a movable latch mounted on the sleeve and coöperating with the guide to hold the sleeve in its adjusted positions while still permitting of its rotation.

56. In a printing mechanism for cash registers, the combination with a driving shaft, of a driving sleeve arranged to be coupled thereto by longitudinal movement, and a movable latch mounted on the sleeve for securing the sleeve in its adjusted positions against longitudinal movement.

57. In a printing mechanism for cash registers, the combination with a driving member, of a driving sleeve arranged to be coupled thereto, a movable latch mounted on said sleeve, and a spring plunger mounted in said sleeve and arranged to operate the latch.

58. In a machine of the character described, the combination with an identifying device bearing a plurality of identifying insignia and movable back and forth to different positions, of manipulative means for predetermining the particular insignia to be utilized in an operation of the machine, and an operating member having intervening operating mechanism for subsequently positively moving said identifying device directly from one position to another in either direction without return movement to a normal starting point.

59. In a machine of the character described, the combination with an indicator, and manipulative means for controlling the same, of an operating mechanism, a lever for setting said indicator, means controlled by said manipulative means for changing the position of the fulcrum of said lever, and means connected with the operating mechanism to act on said lever and bring the point of application of power to an unchanged location of rest.

60. In a machine of the character described, the combination with an indicator, and manipulative means for controlling the same, of an operating mechanism, a lever for setting the indicator, said lever having a fulcrum point and a fixed point thereon for the application of power thereto, and means coöperating with said manipulative means and said operating mechanism for changing the vectorial position of said fulcrum point and said point of application of power whereby to position said indicator upon such application of power.

61. In a cash register, the combination with a primary setting element, of a secondary setting element set to differential distances under the control of the primary setting element; means for giving the secondary setting element its setting movement after the primary setting element has been moved; an indicator; and means for setting the indicator subsequent to the setting movement of the secondary setting element and to an extent controlled thereby.

62. In a cash register, the combination with a setting element, and a series of keys for operating the same differentially, means for latching the keys in operated position, a member for operating accounting devices; means for bringing said member and the setting element together, devices for subsequently positively returning the setting element to normal position whereby to actuate the accounting device member, and means for releasing said keys prior to such positive returning of the setting element.

63. In a cash register, the combination with a series of keys, of a setting element differentially controlled by said keys, means for restoring said element to normal position, a type carrier controlled by said setting element, means for setting said type carrier upon such restoration of said element to normal position, and means for restoring said type carrier to normal position after its said setting movement.

64. In a cash register, the combination with manipulative devices, of an indicator common thereto, means differentially positioned under control of said manipulative devices for controlling the movement of said indicator, and means for moving said means after the same have been positioned to cause differential movement of said indicator.

65. In a cash register, the combination with a plurality of manipulative devices, of an indicating mechanism, devices having a differential movement controlled by said manipulative devices, connections from said indicating mechanism to said devices including a lever, and means for acting on said lever after said differential devices have been positioned.

66. In a cash register, the combination with a totalizing device, an operating member for same, and means for bringing said totalizing device into operative connection with said member, of a differentially movable element, devices controlled thereby, and operated by movement of said element to certain of its differential positions for preventing the operative relation between said totalizing device and its operating member, a main operating mechanism for positioning said differential member, and manipulative devices for determining the extent of such positioning.

67. In a cash register, the combination with a bank of keys, of a lever differentially adjusted thereby, totalizer operating devices therefor connected to said lever, means for restoring said lever to normal position to actuate said devices, a detent for said keys, and means for moving said detent to releasing position before said lever begins its movement of restoration.

68. In a cash register, the combination with an indicating device, of a lever for positioning same, means for differentially positioning one end of said lever, and devices for adjusting an intermediate part on said lever to a constant point after the said end thereof has been positioned.

69. In a machine of the character described, the combination with a main operating mechanism, of an adjustable identifying device bearing a plurality of indicia, manipulative means for predetermining the extent of adjustment of said device and connections controlled by said manipulative means and constructed to be operated upon an operation of the main operating mechanism to move said identifying device positively by a single movement in either direction directly from one position to another.

70. In a machine of the class described, the combination with a printing element, and means for differentially positioning it, of a totalizer and actuating devices therefor, an arm having connections for preventing actuation of said totalizer by said actuating devices, and an element permanently connected to said positioning means and slidingly connected to said arm.

71. In a machine of the character described, the combination with a main operating mechanism, of an adjustable identifying device bearing a plurality of indicia, manipulative means for predetermining the extent of adjustment of said device, and intervening mechanism controlled by the manipulative means and constructed to be operated upon an operation of the main operating mechanism to move said identifying device directly from one position to another in either direction.

72. In a machine of the class described, the combination with a main operating mechanism, of an adjustable identifying device bearing a plurality of identifying insignia and movable back and forth to different positions, of a differentially movable member and connections controlling the movement of the identifying device directly from one position to another in either direction, means rendered effective upon an operation of the main operating mechanism for effecting the movement of the identifying device, and a series of keys actuating said member.

73. In a machine of the class described, the combination with an identifying device bearing a plurality of identifying insignia and movable back and forth to different positions, of a member movable differentially from a normal position and returned to said position at each operation of the machine, and connections from said member for controlling the movement of the identifying device directly from one position to another in either direction.

74. In a machine of the class described, the combination with an identifying device bearing a plurality of identifying insignia and movable back and forth to different positions, of a series of keys, a member differentially movable thereby from a normal position, and means subsequently returning said member to its normal position, the said member by its return movement controlling the movement of the identifying device directly from one position to another in either direction.

75. In a machine of the class described, the combination with a digit carrier bearing a plurality of characters, of a couple comprising two members which are always connected, one member of said couple being connected to the digit carrier and means for first positioning one member and then moving the other member an extent determined by the position of the first moved member to actuate the digit carrier.

76. In a machine of the class described, the combination with a digit carrier bearing a plurality of characters, of a couple comprising two members, one of which is connected to the digit carrier, means for first positioning one member and then moving the other member an extent determined by the position of the first mentioned member to actuate the digit carrier, and manipulative means controlling the movement of the first moved member.

77. In a machine of the class described, the combination with a digit carrier bearing a plurality of characters, of a couple comprising two members one of which is connected to the digit carrier, means connecting said members of the couple, and mechanism for first positioning one member and then actuating the connecting means to move the other member to operate the digit carrier.

78. In a machine of the class described, the combination with a digit carrier bearing a plurality of characters, of a couple comprising two members one of which is connected to the digit carrier, and means for first positioning one member, then locking said member and finally moving the other member an extent determined by the position of the first moved member to actuate the digit carrier.

79. In a machine of the class described, the combination with an identifying device bearing a plurality of identifying insignia and movable back and forth to different positions, of a couple comprising two members, and means for first positioning one member and then moving the other member an extent determined by the position of the first moved member, with connections whereby the movement of the second member controls the movement of the identifying device directly from one position to another in either direction.

80. In a machine of the class described, the combination with an identifying device bearing a plurality of identifying insignia and movable back and forth to different positions, of a couple comprising two members, means for first positioning one member and then moving the other member an extent determined by the position of the first moved member, with connections whereby the movement of the second member controls the movement of the identifying device directly from one position to another in either direction, and manipulative means controlling the movement of the first mentioned member.

81. In a printing mechanism for cash registers, the combination with type carriers, of means for feeding a check strip into position to have an impression taken thereon from the type carriers, means for taking the impression, operated by the feeding means, mechanism for operating the feeding means, a device connecting the operating mechanism and feeding means, means for adjusting the said device to disconnect the operating mechanism and feeding means, and means carried by the adjustable device for holding said device in its adjusted position.

82. In a printing mechanism, the combination with an operating mechanism, of a plurality of type carriers, a pair of rollers for feeding a check strip into position to have an impression taken thereon from the type carriers, means operated by one of the feed rollers for taking an impression on the check strip from the type carriers, a device connecting the operating mechanism and feed rollers, means for adjusting the said device to disconnect the operating mechanism and feed rollers, and means carried by the adjustable device for holding said device in its adjusted position.

83. In a printing mechanism, the combination with an operating mechanism, of a plurality of type carriers, rollers for feeding a check strip into position to have an impression taken thereon from the type carriers, means operated by one of the feeding rollers for taking an impression on the check strip from the type carriers, a pinion connecting the operating mechanism and feeding rollers, means for adjusting the said pinion to disconnect the operating mechanism and feed rollers, and a latch carried with the pinion for holding said pinion in its adjusted position.

84. In a machine of the class described, the combination with an accounting device, of an actuator therefor, a lever connected to said actuator, means for engaging and moving said lever at another point whereby movement is imparted to the actuator, and key actuated means for controlling the differential fulcruming of said lever at still another point whereby the extent of movement of said actuator may be controlled.

85. In a machine of the class described, the combination with an accounting device, of a differentially movable actuator therefor, a lever arranged to engage and move said actuator, a member having an invariable movement arranged to engage said lever, and key actuated means for controlling the differential fulcruming of said lever for the purpose of causing differential movements of said actuator.

86. In a machine of the class described, the combination with a series of setting elements, of a series of key actuated means for controlling the actuation of the same, a series of operating members, means for operatively engaging and disengaging the setting elements and the key actuated means, and accounting mechanism actuated by the operating members.

87. In a machine of the class described, the combination with an accounting device, of a differentially movable actuating member therefor, a driving means, mechanism intermediate the driving means and the actuating member constructed to be pivoted at different points whereby the driving means through the intermediate mechanism imparts a differential movement to the actuating member, and manipulative devices for determining the pivotal point of the intermediate mechanism.

88. In a machine of the class described, the combination with an accounting device, of a differentially movable actuating member therefor, of a link connected at one end to the actuating member and arranged to be pivoted at different points at its other end whereby the actuating member has imparted thereto a differential movement, a driving means for said link, and manipulative devices for determining the pivotal point of the link.

In testimony whereof I affix my signature, in the presence of two witnesses.

THOMAS CARROLL.

Witnesses:
LEWIS D. BAKER,
H. C. WOOD.

---

It is hereby certified that in Letters Patent No. 1,097,703, granted May 26, 1914, upon the application of Thomas Carroll, of Dayton, Ohio, for an improvement in "Cash-Registers," an error appears in the printed specification requiring correction as follows: Page 11, lines 20, 39, 40, 71, and 72, for the word "counter" read *totalizer;* and that the said Letters Patent should be read with this correction therein that the same may conform to the record of the case in the Patent Office.

Signed and sealed this 23rd day of June, A. D., 1914.

[SEAL.]

R. F. WHITEHEAD,
*Acting Commissioner of Patents*